(12) United States Patent
Thakur et al.

(10) Patent No.: US 9,389,797 B2
(45) Date of Patent: Jul. 12, 2016

(54) SYSTEM AND METHOD FOR PROVIDING ARBITRARY PROTECTION TOPOLOGIES IN A COMPUTING CLUSTER

(71) Applicant: NetApp, Inc., Sunnyvale, CA (US)

(72) Inventors: Neelesh Thakur, Sunnyvale, CA (US); David Milani, Sunnyvale, CA (US); Meni Hillel, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 501 days.

(21) Appl. No.: 13/951,546

(22) Filed: Jul. 26, 2013

(65) Prior Publication Data

US 2015/0033133 A1   Jan. 29, 2015

(51) Int. Cl.
| | |
|---|---|
| *G06F 3/14* | (2006.01) |
| *G06F 3/06* | (2006.01) |
| *G06F 9/455* | (2006.01) |
| *G06F 11/20* | (2006.01) |
| *H04L 29/08* | (2006.01) |
| *H04L 29/06* | (2006.01) |
| *H04L 12/24* | (2006.01) |

(52) U.S. Cl.
CPC ............... *G06F 3/0647* (2013.01); *G06F 9/455* (2013.01); *G06F 11/2094* (2013.01); *H04L 41/0663* (2013.01); *H04L 41/0893* (2013.01); *H04L 41/12* (2013.01); *H04L 67/10* (2013.01); *H04L 67/42* (2013.01); *H04L 41/22* (2013.01); *H04L 41/5096* (2013.01)

(58) Field of Classification Search
CPC ..................................... G06F 3/14; G06F 3/17
USPC ............ 715/735; 709/201, 203, 225, 679; 1/1
See application file for complete search history.

(56) References Cited

U.S. PATENT DOCUMENTS

| | | | | |
|---|---|---|---|---|
| 8,095,590 | B1 * | 1/2012 | Holm | H04L 12/1863 709/201 |
| 8,458,138 | B1 * | 6/2013 | Sirianni | G06F 17/30221 707/679 |
| 2005/0021751 | A1 * | 1/2005 | Block | G06F 9/54 709/225 |
| 2008/0077635 | A1 * | 3/2008 | Sporny | G06F 17/30206 |
| 2012/0109958 | A1 | 5/2012 | Thakur et al. | |
| 2013/0066951 | A1 * | 3/2013 | Agranat | H04J 14/0227 709/203 |

OTHER PUBLICATIONS

NetApp® OnCommand® , "Unified Manager, Guide to Common Provisioning and Data Protection Workflows for 7-Mode," Part No. 210-05421_A0, Jul. 2012, 176 pgs.

* cited by examiner

*Primary Examiner* — Ruay Ho
(74) *Attorney, Agent, or Firm* — Klein, O'Neill & Singh, LLP (57) ABSTRACT

Methods and systems for a computing cluster are provided. An application programming interface (API) at a manager application is exposed. The API specifies input identifying nodes and connections between the nodes to implement storage protection policies in the computing cluster. A user input that includes instructions to implement multiple destination nodes and respective connections between a source node and the destination nodes is received. A topology that includes the source node, the destination nodes, and the connections between the source node and the destination nodes is traversed. Based on traversing the topology, commands are sent to a storage system of the cluster to implement a destination volume corresponding to the destination node and multiple protection configurations. Each of the protection configurations corresponds to a respective one of the connections.

14 Claims, 4 Drawing Sheets

SYSTEM AND METHOD FOR PROVIDING ARBITRARY PROTECTION TOPOLOGIES IN A COMPUTING CLUSTER

TECHNICAL FIELD

The present disclosure relates generally to computing system clusters and, more particularly, to providing for arbitrary protection topologies in such clusters.

BACKGROUND

As computing and storage solutions become more distributed in nature, the cluster architectures may offer a variety of protection configuration possibilities. For instance, a primary storage volume (e.g., a logical volume) within a network storage system may be backed up by a mirror or vault implemented by a secondary volume. In fact, the primary volume may be backed up by more than one secondary volume in a "fan-out" configuration. Additionally, some systems may allow for further backup of any of the secondary volumes by one or more tertiary volumes. Thus, as systems get more sophisticated and as cluster architectures get more advanced, the possibilities for protection configurations grows.

A particular conventional storage management system provides a user with several different pre-set protection configurations from which to choose. For instance, one conventional storage management system allows for a user to choose a fan out arrangement where a primary storage volume is mirrored in parallel to two secondary volumes. However, such conventional system does not provide for a three-way fan out or four-way fan out. During a setup process, an administrator chooses from the fixed number of options of protection configurations. The administrator inputs the choice, and a management application implements the protection configuration by communicating commands with one or more storage controllers. The storage controllers, implementing a storage operating system, receive the commands and provide low-level control of the physical storage drives to provide virtualized storage according to the chosen configuration option.

Accordingly, it would be desirable to provide improved methods and systems for managing the protection configuration options at a storage management system.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Various embodiments of the present disclosure provide for techniques that allow a user to configure protection topologies arbitrarily for a clustered storage systems. The storage management domain includes a storage management server and at least one storage subsystem. The storage subsystem includes a storage controller and an array of storage drives (e.g., hard disk drives or solid state drives). The storage controller implements lower-level control over the storage array to provide for virtualized storage. The storage management server communicates with the storage controllers and with one or more clients, where the storage server provides for administrative control over the storage subsystem Administrative control over the storage subsystem is facilitated by a manager program that runs on the storage management server. The manager program includes a utility that receives user input to provision volumes and set up protection configurations within the storage subsystem. In one example, the manager program communicates with a backup application, where the backup application is used by an administrator to specify a protection configuration for the system. The administrator provides input at a UI of the backup application to define nodes and connections between the nodes, where the nodes and connections are a conceptual way to identify a desired topology.

Continuing with the example, the nodes represent storage volumes in the storage subsystem. For example, a node may include a primary virtual volume, a secondary volume, a tertiary volume, etc. Connections between the nodes indicate relationships of one node to another. For instance, a connection may specify whether a node is a mirror or a vault to back up a primary volume. Connections may also include other relationship information, such as backup scheduling and the like. Connections and nodes are discussed in more detail below with respect to FIGS. 2 and 3.

The manager application exposes Application Programming Interfaces (APIs) that define how information from the backup application is communicated to the manager program. In this example, the APIs exposed by the manager program receive input from the backup application at a node-by-node and connection-by-connection level. Thus, the administrator at a User Interface (UI) of the backup application can specify protection configurations by adding nodes and connections in an arbitrary manner.

The manager program receives the input from the Backup Application, as defined by the APIs. The manager program then traverses the "tree" formed by the nodes and connections and translates the node and connection input into volume provisioning and storage policy operations for use at the storage controller. The manager program then communicates the volume provisioning and storage policy operations to the storage controller. The storage controller then provides storage-subsystem-level control to implement the protection configuration at the storage drives.

Various embodiments provide one or more advantages over conventional systems. For instance, the ability to construct properties of protection at a level of singular nodes and singular connections allows for the creation of arbitrary protection topologies. Conventional systems, by contrast, select from a menu of pre-set protection topologies. Thus, the user is given more flexibility in determining types of protection to use.

Additionally, the APIs discussed below (which allow for the presentation of topology information on a node-by-node and connection-by-connection level of granularity) provide for flexibility in design options. Specifically, the APIs exposed by the manager program can be used by any given backup application that is designed with those APIs in mind. Thus, a suite of storage cluster hardware and software is not limited to any particular backup application, but instead, may be paired with an appropriate backup application that can communicate topology input according to the APIs.

While the example above is discussed with respect to setup of a storage system, it should be noted that the scope of embodiments is not so limited. Various embodiments are applicable to a setup process that includes defining nodes and connections before the system has initiated normal operations. However, after an initial setup, it may be possible to add further primary volumes, and various embodiments are also applicable to set up new primary volumes and associated backup protections. Also, various systems may allow for the modification of a previously defined protection configuration, and embodiments of the present disclosure may also be used in those instances to modify or replace existing protection configurations.

Figure 1:
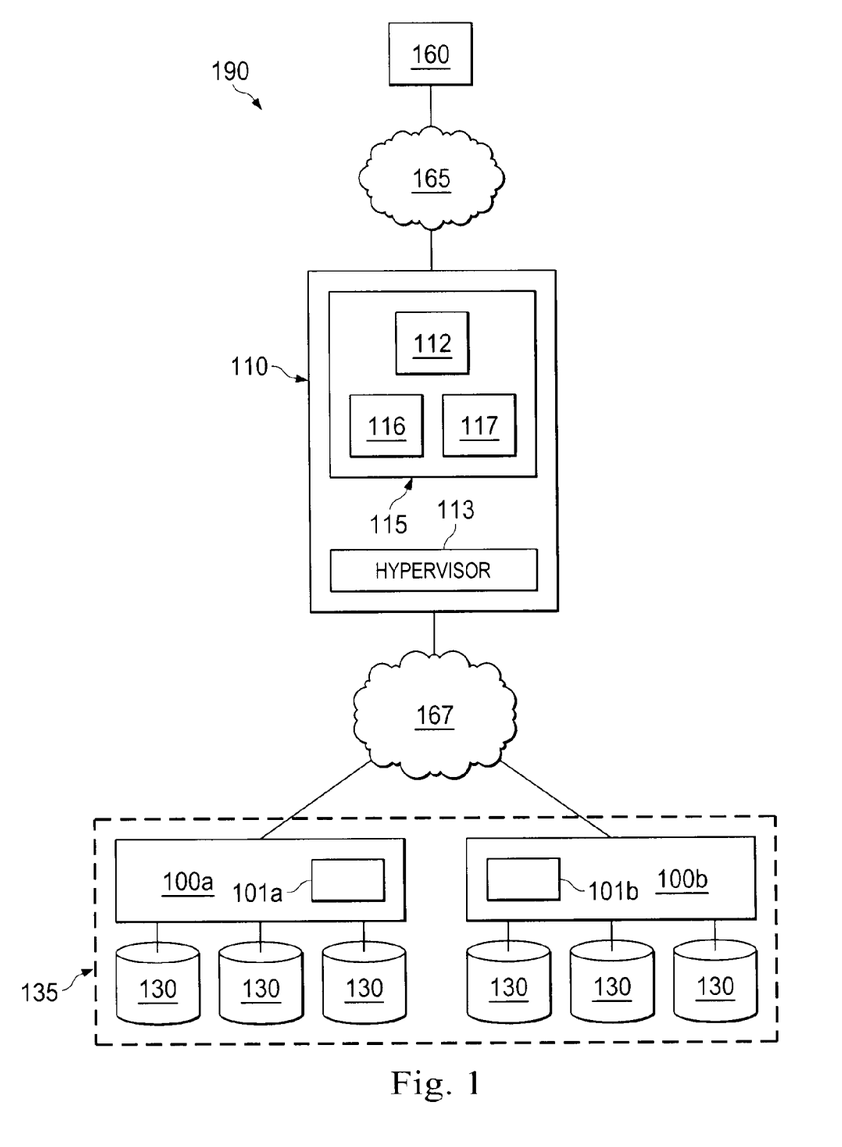
FIG. 1 is a simplified diagram of an example computing system according to some embodiments.

FIG. 1 is an illustration of a network storage system 190 adapted according to one embodiment. The system 190 includes server system 110 connected to client system 160 via a network 165. The server system 110 accesses storage subsystems 100 that are connected to the server system 110 via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to server system 100 and client 160. Examples of storage hardware that can be used as physical storage devices 130 includes, e.g., hard disk drives and solid state drives, though the scope of embodiments is not limited to any particular storage hardware.

Each storage device 130 may include storage objects comprising one or more storage volumes, where each volume has a file system implemented on the volume. A file system implemented on the storage devices 130 may provide multiple directories in a single volume, each directory containing various filenames. A file system provides a logical representation of how data (files) are organized on a volume where data (files) are represented as filenames that are organized into one or more directories. Examples of common file systems include New Technology File System (NTFS), File Allocation Table (FAT), Hierarchical File System (HFS), Universal Storage Device Format (UDF), Unix™. file system, and the like. For the Data ONTAP™ storage operating system (available from NetApp, Inc. of Sunnyvale, Calif.) which may implement a Write Anywhere File Layout (WAFL™) file system, there is typically a WAFL™ file system within each volume, and within a WAFL file system, there may be one or more logical units (LUs). The scope of embodiments is not limited to any particular storage operating system or file system.

Continuing with the example, to facilitate access to the disks 130, the storage operating system implements a write-anywhere file system of a virtualization system that virtualizes the storage space provided by storage drives 130. The file system logically organizes the information as a hierarchical structure of named directory and file objects on the storage drives 130. Each on-disk file may be implemented as set of blocks configured to store information, such as data, whereas the directory may be implemented as a specially formatted file in which names and links to other files and directories are stored. The virtualization system allows the file system to further logically organize information as a hierarchical structure of named virtual disks ("vdisks") on the storage drives, thereby providing an integrated NAS and SAN storage system approach to storage by enabling file-based (NAS) access to the named files and directories, while further enabling block-based (SAN) access to the named vdisks on a file system based storage platform. The file system simplifies the complexity of management of the underlying physical storage in SAN deployments.

Client system 160 includes a computer system that interacts with server system 110 for submitting read/write access requests and for receiving or transmitting data from or to the server system 110 over the network 165. In a virtual server environment, a client system 160 may interact over the network 165 with one or more virtual machines (VMs) executing on a server system 110 for submitting read/write access requests and for receiving or transmitting data from or to the storage system 100 over the network 167.

Server system 110 includes a computer system that executes applications and interacts with the client system 160 for receiving read/write access requests and receiving or transmitting data from or to the client system 160 over the network 165. Server system 110 in this example is connected to the client system 160 over a network 165 such as a local area network (LAN), an Ethernet subnet, a PCI or PCIe subnet, a switched PCIe subnet, a wide area network (WAN), a metropolitan area network (MAN), the Internet, or the like.

The server 110 may include any appropriate computer hardware and software. In one example, server 110 includes a general-purpose computer configured to execute any of a variety of operating systems, including the Unix™, Linux™, and Microsoft Windows™ operating systems.

Various embodiments may be implemented in a Network Attached Storage (NAS) system and in a Storage Area Network (SAN) system. Server systems generally utilize file-based access protocols when accessing information (in the form of files and directories) over a NAS-based network. In such an example, server 110 may request the services of the storage cluster 135 by issuing file access protocol messages (in the form of packets) to the storage cluster 135 over the network 167. For example, a server 110 running the Windows™ operating system may communicate with the storage cluster 135 using the Common Internet File System (CIFS) protocol. On the other hand, a server 110 running the Unix™ operating system may communicate with the multi-protocol storage system using the Network File System (NFS) protocol 164 over TCP/IP 162. The scope of embodiments is not limited to any particular operating system for server 110 nor to any particular file access protocols.

Server 110 may utilize block-based access protocols, such as the Small Computer Systems Interface (SCSI) protocol, when accessing information (in the form of blocks, storage drives or vdisks) over a SAN-based network. SCSI is an input/output (I/O) interface with a standard, device independent protocol that allows different peripheral devices, such as disks 130, to attach to the storage subsystems 100. In SCSI terminology, server 110 operating in a SAN environment is an initiator that initiates requests and commands for data. A given storage system 100 is thus a target configured to respond to the requests issued by the initiator in accordance with a request/response protocol. The initiator and targets have endpoint addresses that, in accordance with the Fibre Channel (FC) protocol, include worldwide names (WWN). A WWN includes a unique identifier, e.g., a node name or a port name, consisting of an 8-byte number.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through a computer network. Thus, systems with more than one client 160 may include more than one VM 115, each client being supported by at least one VM. VM 115 includes an encapsulation or instance of an operating system and applications 112, 116, 117 running executing on top of that instance. Briefly, application 112 provides read/write access to the clients 160 to data stored in cluster 135. Application 116 provides a backup application for creating and managing protection configurations within cluster 135. Application 117 is a manager application that communicates with application 116 to receive input regarding protection topologies and to implement those topologies in cluster 135. The applications 116 and 117 are discussed in more detail below with respect to FIGS. 2 and 3.

In some embodiments, different types of VM hypervisors 113 may be used (e.g., VMware™ ESX, Microsoft™ Hyper-V, etc.). Each different type of VM hypervisor may produce a different type of VM using a different type of virtual storage component. In particular, a first VM produced by a first type of VM manager (e.g., VMware™ ESX) may have different attributes than a second VM produced by a second type of VM manager (e.g., VMware™ Microsoft™ Hyper-V). As such, the attributes of a VM may differ depending on the type of VM hypervisor used to produce the VM. In addition, a first set of virtual storage components allocated to the first VM may have different attributes than a second set of virtual storage components allocated to the second VM. As such, the organization and mapping of a VM 115 to its virtual storage components (on the server 110) to its underlying storage objects on the cluster 135 may differ depending on the type of VM hypervisor used to produce the VM and virtual storage components. The scope of embodiments is not limited to any particular type of hypervisor.

Each storage system 100 is configured to allow server 110 to access its data, for example, to read or write data to the storage system. The server 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server 110. While the example of FIG. 1 shows only one client 160, it is understood that any appropriate number of clients may be supported by the system 190. Moreover, while cluster 135 shows two storage subsystems 100*a* and 100*b*, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster. A topology may span multiple clusters and define relationships both within a cluster and between clusters. In one example, a topology defines a mirror within the same cluster for fast restore and a fan-out mirror to a remote cluster for disaster recovery.

Figure 2:
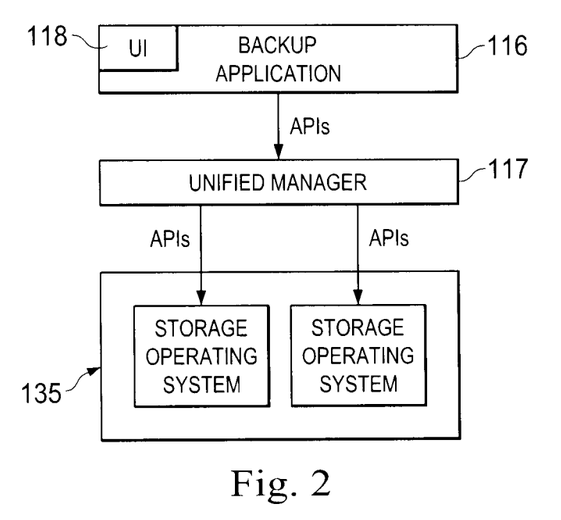
FIG. 2 is a simplified block diagram of an example relationship among applications and a storage cluster according to some embodiments.

FIG. 2 is a block diagram illustration of an exemplary conceptual layout according to one embodiment. Application 117 is a manager application (or unified manager) that provides for administrative and technical support of the storage cluster 135. Application 116 is a backup application that allows a user (e.g., an administrator to technician) to interact with application 117 to, e.g., create or modify protection configurations, via UI 118. As explained above with respect to FIG. 1, applications 116 and 117 may be run in a VM in a storage server.

Figure 3:
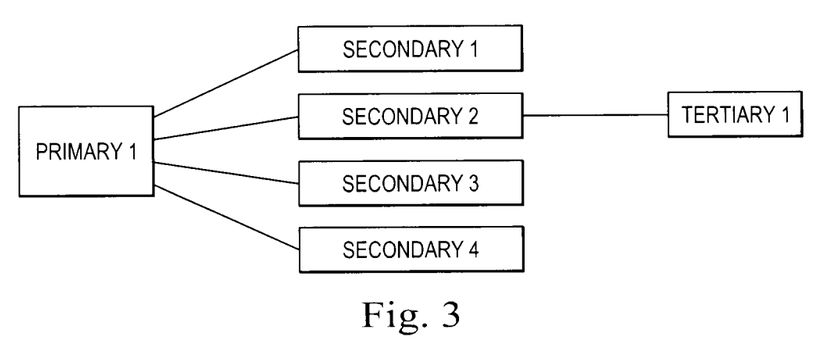
FIG. 3 is a simplified diagram of an example protection topology according to some embodiments.

It is noted that UI 118 may include a command line interface, a graphical user interface (GUI), or other appropriate interface. It is further noted that the feature of the application 117 to receive information from the application 116 at a node-by-node and connection-by-connection level of granularity provides for UI 118 to also receive input from a user at a similar level of granularity in some embodiments. Application 117 exposes APIs to application 116, where the APIs specify how application 116 should present protection topology information to application 117. In one example, an administrator desires to create a storage system with one primary (source) node, four secondary (destination) nodes, and one tertiary (destination node), as shown in FIG. 3. The input received by the application 117 from application 116 to implement such topology may include, e.g.:

create: primary one, secondary one, secondary two, secondary three, secondary four, tertiary one.

connections: primary one to secondary one (specify mirror or vault and applicable policies), primary one to secondary two (specify mirror or vault and applicable policies), primary one to secondary three (specify mirror or vault and applicable policies), primary one to secondary four (specify mirror or vault and applicable policies), secondary two to tertiary one (specify mirror or vault and applicable policies).

A collection of nodes and connections can be conceptually referred to as a tree, as the branching structure of FIG. 3 is reminiscent of a tree. However, various embodiments are not limited to topologies that "fan out," as any appropriate protection topology may be used. The scope of embodiments is not limited to any particular API, though example APIs for some embodiments include the following. The storage-service-create API takes as input a storage-service-topology-information element consisting of a set of storage-service-node-information and storage-service-connection-information elements each specifying the properties specific to the nodes and connections of the topology. Internal to the storage management server 110 (FIG. 1), this information is represented and persisted as a storage service object consisting of node and connection objects. Other APIs provide for managing the storage services, such as listing their attributes, modification and deletion. Still other APIs provide the client application the ability to subscribe volumes to the service for protection. Once subscribed, the storage-service-conform API causes the storage management application to traverse the tree defined in the storage service and configure the storage subsystem to conform to the properties specified in the nodes and connections, e.g., to provision secondary and tertiary volumes and the mirror and backup vault relationships.

Returning to FIG. 2, application 117 also uses a different set of APIs to communicate with cluster 135. Upon receiving the input from the application 116 (where the input specifies nodes and connections therebetween), application 117 traverses the tree and translates the node and connection information into volume provisioning and mirror create commands to send to the clustered storage operating system of cluster 135. Specifically, the node information that is received from application 116 indicates storage volumes to be created, and the connection information indicates the protection configuration particulars of the relationships between the nodes. As application 117 traverses the tree, it translates the generic nodes into particular source and destination volumes to be implemented within the physical storage drives 130 of cluster 135. Similarly, the application 117 translates the connections into the particular policies and operations that specify how a particular destination volume backs up a particular source volume. Different rules or business logic gets invoked depending on the node/connection properties. Intelligence within application 117 chooses particular operations from a library of storage operating system commands to implement the protection topology in cluster 135.

Volume provisioning commands include commands to create source and destination volumes, size specifications of the volumes, selection of storage drive arrays on which to implement the volumes, and the like. Mirror create commands include specifications of relationship type with respect to the primary volume (e.g., mirror or vault), backup scheduling, bandwidth use throttling, various use policies, and the like. According to one embodiment, when traversing the tree, application 117 selects appropriate volume provisioning and mirror create commands from a library. Application 117 then sends the commands to storage subsystems 100 (FIG. 1) to cause storage subsystems 100 to create the volumes and implement the protection procedures. Table 1 (below) provides some example commands in the Data ONTAP™ storage operating system that may be included in a library of commands for use by application 117. However, as noted above, the scope of embodiments is not limited to any particular storage operating system.

TABLE 1

| Command | Description |
| --- | --- |
| Volume-create | Provisions a volume from aggregate storage |
| Vserver-peer-create | Establishes management relationships between source and destination virtualized storage subsystems |
| Snapmirror-create | Establishes protection relationships beween source and destination volumes. |
| Snapmirror-initialize | Replicates a baseline snapshot or data copy from source to destination. |
| Snapmirror-update | Replicates incremental snapshots or data copies from source to destination. |

FIG. 2 shows a relationship between applications 116 and 117, and it is consistent with FIG. 1, which shows applications 116 and 117 as separate applications running on a same operating system instance at server 110. However, the scope of embodiments is not so limited. In some examples, application 116 may run on a client computer, thereby allowing an administrator or other user to set up protection configurations using a client computer connected to the server over a network. In another example, the server includes a display peripheral (e.g., a computer monitor) that displays the UI 118 of application 116 to the user. In another embodiment, the user or administrator accesses application 116 via a dumb terminal coupled to the storage server. In any event, the applications 116 and 117 communicate with each other by exposed APIs according to the examples above.

Figure 4:
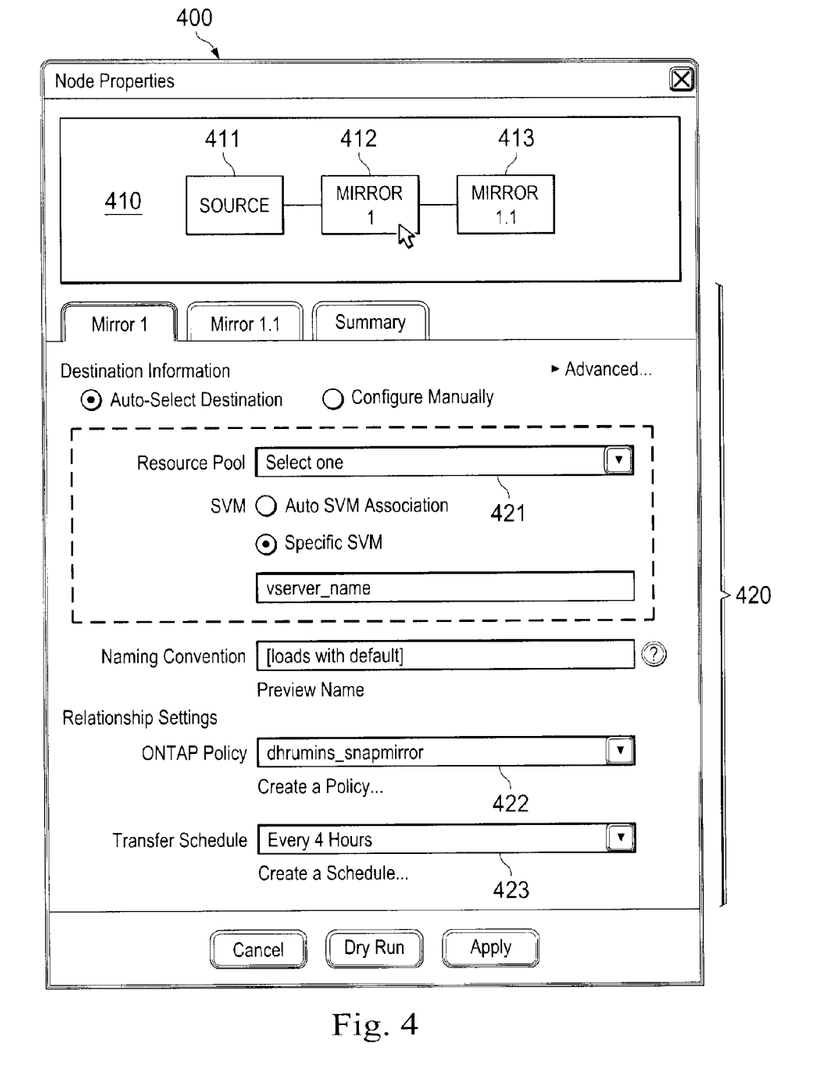
FIG. 4 is an illustration of an example user interface according to some embodiments.

FIG. 4 is an illustration of an example interface 400 by which a user may enter information to indicate a desired protection configuration according to one embodiment. For instance, UI 400 could be used as UI 118 in FIG. 2 in some embodiments. Interface 400 includes portion 410, which displays nodes 411, 412, 413. In this example, node 411 is a source (primary node), node 412 is a destination (secondary) node that mirrors the data of node 411, and node 413 is a destination (tertiary) node that mirrors data on node 412. Portion 410 may be used in some embodiments as a graphical tool to add nodes, though in other embodiments it may simply display nodes that have been created using another screen (not shown). For instance, a different screen may graphically, by command line interface, or by other technique allow a user to create nodes. Portion 420 allows a user set properties of the nodes and the connections. For example, drop-down selector 421 allows a user to designate a resource pool of node 412, and drop-down selectors 422 and 423 allow the user to designate relationship settings affecting the connection between nodes 411 and 412. It should be noted, though, that the scope of embodiments is not limited to any particular UI.

Figure 5:
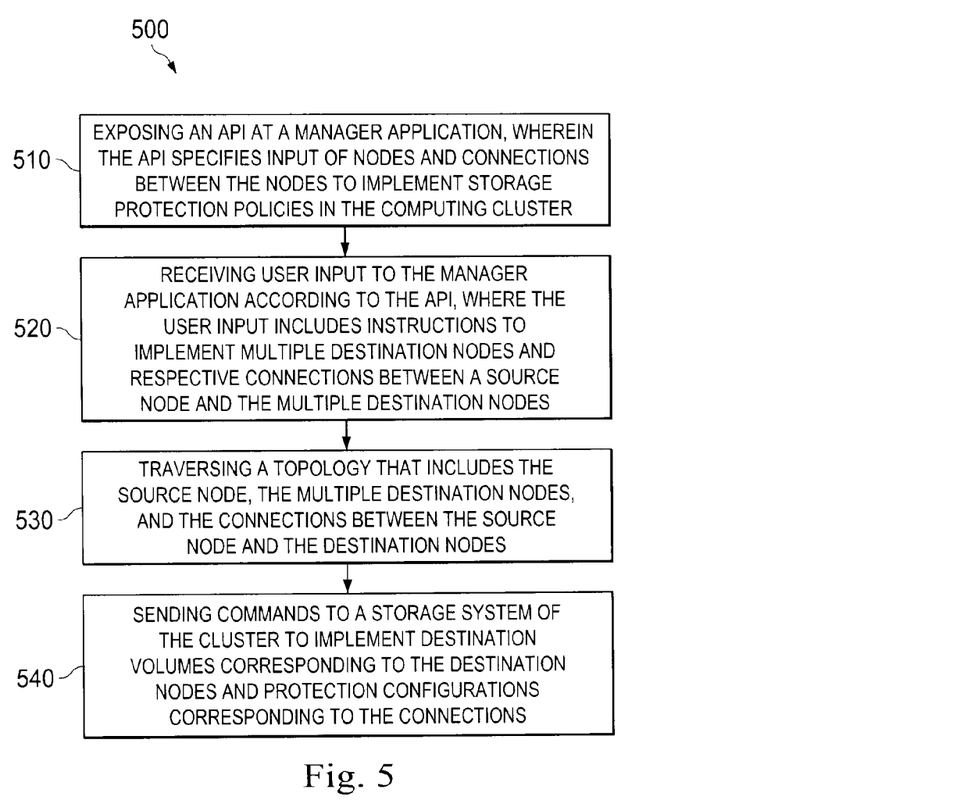
FIG. 5 is an illustration of an example method according to some embodiments.

FIG. 5 is a simplified block diagram of example process 500, adapted according to one embodiment. Process 500 includes the specification and creation of protection configurations and may be performed by one or more computer processors executing application 117. For instance, a storage server (e.g., server 110 of FIG. 1) may execute a virtual machine that has a variety of applications running therein, where application 117 is one such application.

Block 510 includes exposing an API at a manager application. The API specifies input of nodes and connections between the nodes to implement storage protection policies in the computing cluster. The manager application runs on a server in a computing system having a management domain. An example of the application includes application 116, and an example of a computing system includes system 190 of FIG. 1, which has server 110 and multiple storage subsystems 100 acting together to provide storage for clients 160.

Block 520 includes receiving user input to the manager application according to the API. The user input includes instructions to implement multiple destination nodes and respective connections between a source node and the multiple destination nodes. As explained above, the nodes are an abstraction that represent volumes that are created or will be created in one or more storage subsystems. Also, as explained above, the connections include protection relationships with respect to the storage volumes represented by the nodes. Further in this example, the protection topology is a more complex topology that includes multiple destination nodes.

The user input of block 520 is received at the manager application at a level of specificity that includes the source node, the multiple destination nodes, and the connections between the source node and the destination nodes. The input received at the manager application may also include additional nodes and connections, but the input itself is received at a node-by-node and connection-by-connection level of specificity. Thus, a protection configuration of multiple nodes and at least one connection is described with reference to the individual nodes and individual connections. Furthermore, the input regarding the individual nodes includes information regarding properties (e.g., types) of the nodes, and the input regarding connections includes properties of those connections (e.g., specific backup properties) so that the manager application itself makes few, if any, assumptions about the topology Such feature may allow the input from the interface application to the manager application to specify any of a variety of configurations that can be described by an arbitrary number of nodes and the connections therebetween. Of course, various applications may place a limit on the number of nodes and connections that are supported as a function of, e.g., computing power and available size and type of storage subsystems.

An example of configuration information that may be passed from the UI to the manager application includes the information described above with respect to FIGS. 2 and 3. Furthermore, existing protection configurations can be scaled up or scaled down on a node-by-node basis in some examples. The action of block 520 is provided in contrast to conventional systems that allow a user to select from a variety of pre-set protection configurations, where the input from the UI to the manager application is not amenable to a node-by-node or connection-by-connection breakdown.

Block 530 includes traversing a topology that includes the source node, the multiple destination nodes, and the connections between the source node and the multiple destination nodes. As noted above, the topology may be referred to as a tree, whether or not the tree has many branches. Block 530 includes programmatically examining the nodes and connections. The manager application then determines storage volumes to be created based upon the nodes and protection procedures and policies with respect to those volumes based upon the connections.

Block 530 may also include examining a library of storage operating system commands and selecting ones from the library that are appropriate to implement the storage volumes and protection procedures within the storage subsystems.

Block 540 includes sending commands to a storage system of the cluster to implement the multiple destination volumes corresponding to the destination nodes and a protection configuration corresponding to the connection. Block 540 may also include sending a command to implement the source volume in systems in which the source volume has not yet been created. This is in contrast to some systems in which the source volume is created first and protection configurations are created later.

The scope of embodiments is not limited to the actions shown in FIG. 5. Other embodiments may add, omit, rearrange, or modify one or more actions as appropriate. For instance, some embodiments may include storing protection configuration metadata in the manager application for later retrieval or modification.

It should be noted that the examples above are given in the context of a network storage system, through the scope of embodiments is not so limited. Rather, the concepts described above may be implemented in any type of computing cluster, wherein policies may be set with reference to different nodes in the cluster. One example embodiment includes a cluster of servers, where the servers have different responsibilities (e.g., primary and backup). In such embodiment, block 520 may include nodes that represent the different servers in the cluster and connections that represent the responsibility relationships among the servers. Method 500 would then use the nodes and connections in the input to implement the server responsibilities within the cluster.

Figure 6:
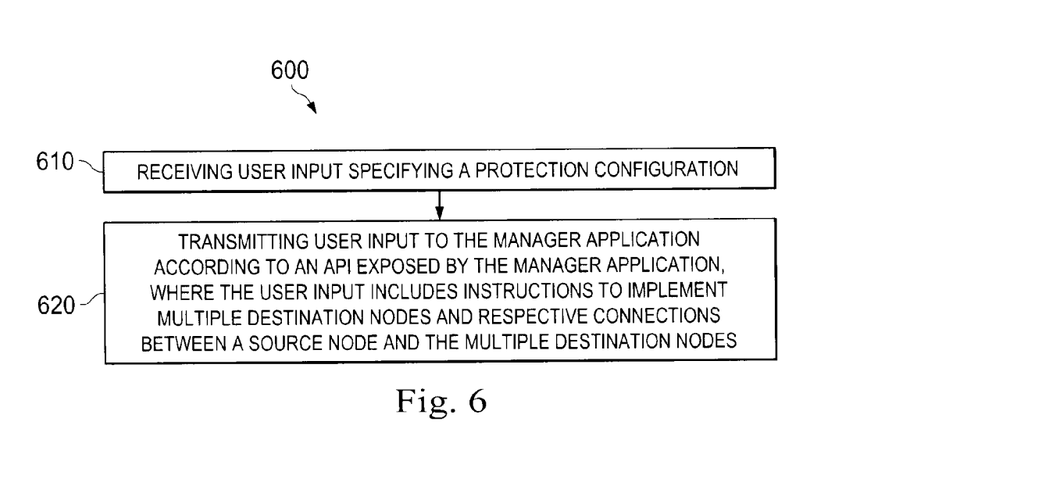
FIG. 6 is an illustration of an example method according to some embodiments.

FIG. 6 is a simplified block diagram of example process 600, adapted according to one embodiment. Process 600 includes the receipt and transmission of user input and may be performed by one or more computer processors executing application 116. For instance, a storage management server (e.g., server 110 of FIG. 1) may execute a virtual machine that has a variety of applications running therein, where application 116 is one such application. As mentioned above, application 116 may be executed on a computer different from server 110 in some embodiments.

At block 610, the backup application receives user input specifying a protection configuration. The user input may be received via a GUI, a command line, or other type of interface.

Block 620 includes transmitting user input to the manager application according to an API exposed by the manager application, where the user input includes instructions to implement multiple destination nodes and respective connections between a source node and the destination nodes. For instance, block 620 may include transmitting the user input as the user input is described above with respect to block 520 of FIG. 5.

Block 610 or block 620 may include translating the user input into another format consistent with that specified by the API, if appropriate. For instance, in one example the UI is a GUI that allows a user to build a tree by arranging nodes and connections graphically, and block 610 may include translating the layout of nodes into a format compatible with the API.

It should also be noted that the actions of FIG. 6 may be applied to any computing cluster, not just clusters that provide storage. Thus, in one example, the user input specifies relationships among servers in a computing cluster.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, and storage controllers 101 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of methods 500 and/or 600 as described above.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A computer program product having a non-transitory, computer readable medium tangibly recording computer program logic for configuring a computing cluster, the computing cluster including a manager application running on a server and executed by a processor executing instructions out of a memory, the processor executable, manager application providing for configuration of the computing cluster, the computer program product comprising:

code to receive input to the manager application according to an application programming interface (API) exposed by the manager application, where the input includes instructions to implement a topology having a source node, multiple destination nodes, and respective connections between the source node and the multiple destination nodes, the input having a level of granularity to individually indicate the source node, each of the destination nodes, and the respective connections between the source node and the destination nodes;

code to select a set of commands by the management application for a subsystem of the computing cluster, the set of commands based upon the input and adapted to cause the computing cluster to configure the destination nodes within physical devices of the subsystem and to implement policies with respect to the destination nodes according to the connection;

wherein the subsystem comprises a storage subsystem and the code to select a set of commands comprises: code to traverse the topology by translating the destination nodes into storage volumes to be implemented in a storage subsystem and translating the connections into protection relationships of the storage volumes; and wherein one of the protection relationships comprises designating a first one of the storage volumes as a primary storage volume and a second one of the storage volumes as a mirror of the primary storage volume;

code to select storage operating system commands by the management application to implement the storage volumes and protection relationships in the storage subsystem; and code to transmit the set of commands to the subsystem by the management application.

2. The computer program product of claim 1, wherein the code to receive input comprises:
code to receive the input from a backup application separate from the manager application.

3. The computer program product of claim 1, wherein the code to select a set of commands comprises:
code to select commands to implement each of the destination nodes as a storage volume in the subsystem, wherein each of the connections is implemented as a protection relationship between the source node and one of the destination nodes.

4. The computer program product of claim 1, wherein one of the protection relationships comprises designating a first one of the storage volumes as a primary storage volume and a second one of the storage volumes as a vault to back up the primary storage volume.

5. A method comprising:
exposing an application programming interface (API) at a manager application, the manager application running on a server in a computing cluster executed by a processor executing instructions out of a memory, wherein the API specifies input identifying nodes and connections between the nodes to implement storage protection policies in the computing cluster;
receiving user input to the manager application according to the API, where the user input includes instructions to implement multiple destination nodes and respective connections between a source node and the destination nodes, the user input received at the manager application at a level of specificity that includes each of the destination nodes individually and each of the connections between the source node and the destination nodes individually;
traversing a topology by the management application that includes the source node, the destination nodes, and the connections between the source node and the destination nodes; and based on traversing the topology, sending commands by the management application to a storage system of the cluster to implement a destination volume corresponding to the destination node and multiple protection configurations, each of the protection configurations corresponding a respective one of the connections; and based on traversing the topology, sending commands by the management application to a storage system of the cluster to implement a destination volume corresponding to the destination node and multiple protection configurations, each of the protection configurations corresponding a respective one of the connections; and sending a command by the management application to the storage system to implement a source volume corresponding to the source node; wherein the protection configuration comprises designating the source volume as a primary storage volume and the destination volume as a vault to back up the primary storage volume.

6. The method of claim 5, further comprising:
receiving the user input from a backup application separate from the manager application.

7. The method of claim 5, wherein traversing the topology comprises:
selecting the commands from a library of storage operating system commands.

8. A server in a computer system, the server comprising:
a processor; and
a memory accessible by the processor and storing computer-readable instructions, the processor performing the following actions by executing the instructions:
receiving user input specifying a topology for a set of nodes and connections therebetween, where the topology comprises multiple destination nodes, and where the user input includes a level of specificity of the individual nodes and individual connections between nodes; wherein information regarding each connection includes a description of a relationship between a source node and one of the destination nodes and at least one storage policy relating to the one of the destination nodes; and wherein the policy designates a source storage volume and designates the one of the destination nodes as a mirror of the source storage volume; and
implementing the topology in a storage cluster according to the received user input.

9. The server of claim 8, wherein receiving user input comprises:
receiving the user input from a user interface according to an application programming interface (API) at a manager application running in a virtual machine at the server.

10. The server of claim 8, wherein the processor further exposes an application programming interface (API) at a manager application to receive the user input from a user interface.

11. The server of claim 8, wherein the user input is received from a client computer in communication with the server, the client computer running a user interface application to receive the user input, and the server running a manager application to implement the topology.

12. The server of claim 8, wherein the policy designates a source storage volume and designates the one of the destination nodes as a vault to back up the source storage volume.

13. The server of claim 8, wherein the nodes comprise storage volumes in an array of physical storage drives, and the connections comprise protection relationships of the storage volumes.

14. The server of claim 8, wherein the processor performs the following actions by executing the instructions:

traversing the topology by translating the nodes into storage volumes to be implemented in the storage cluster and translating the connections into protection relationships of the storage volumes; and selecting storage operating system commands to implement the storage volumes and protection relationships in the storage cluster.

\* \* \* \* \*